April 24, 1951     H. BORGERDING     2,550,523
DISHWASHING MACHINE FEEDER
Filed Aug. 21, 1947     3 Sheets-Sheet 1
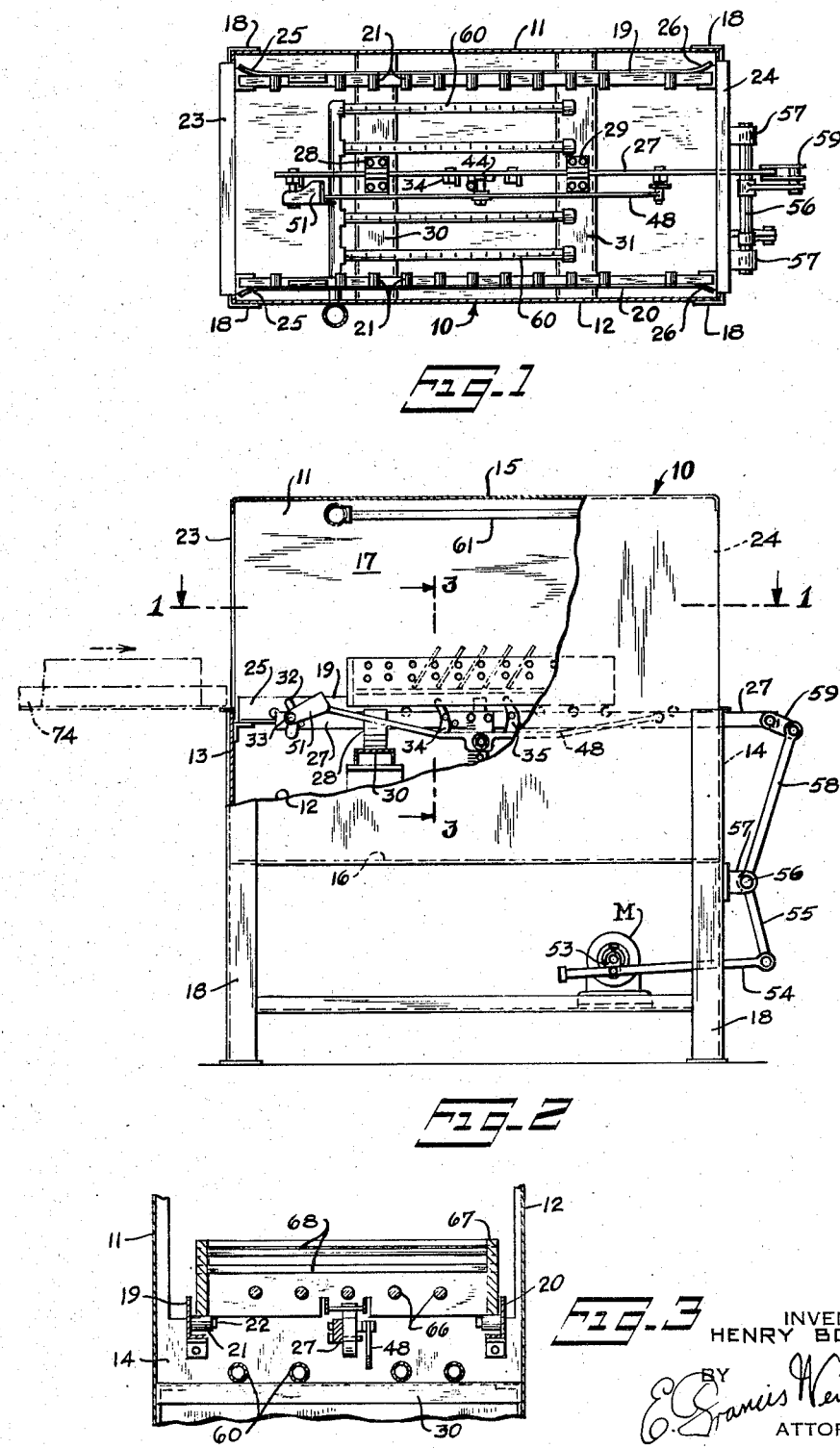

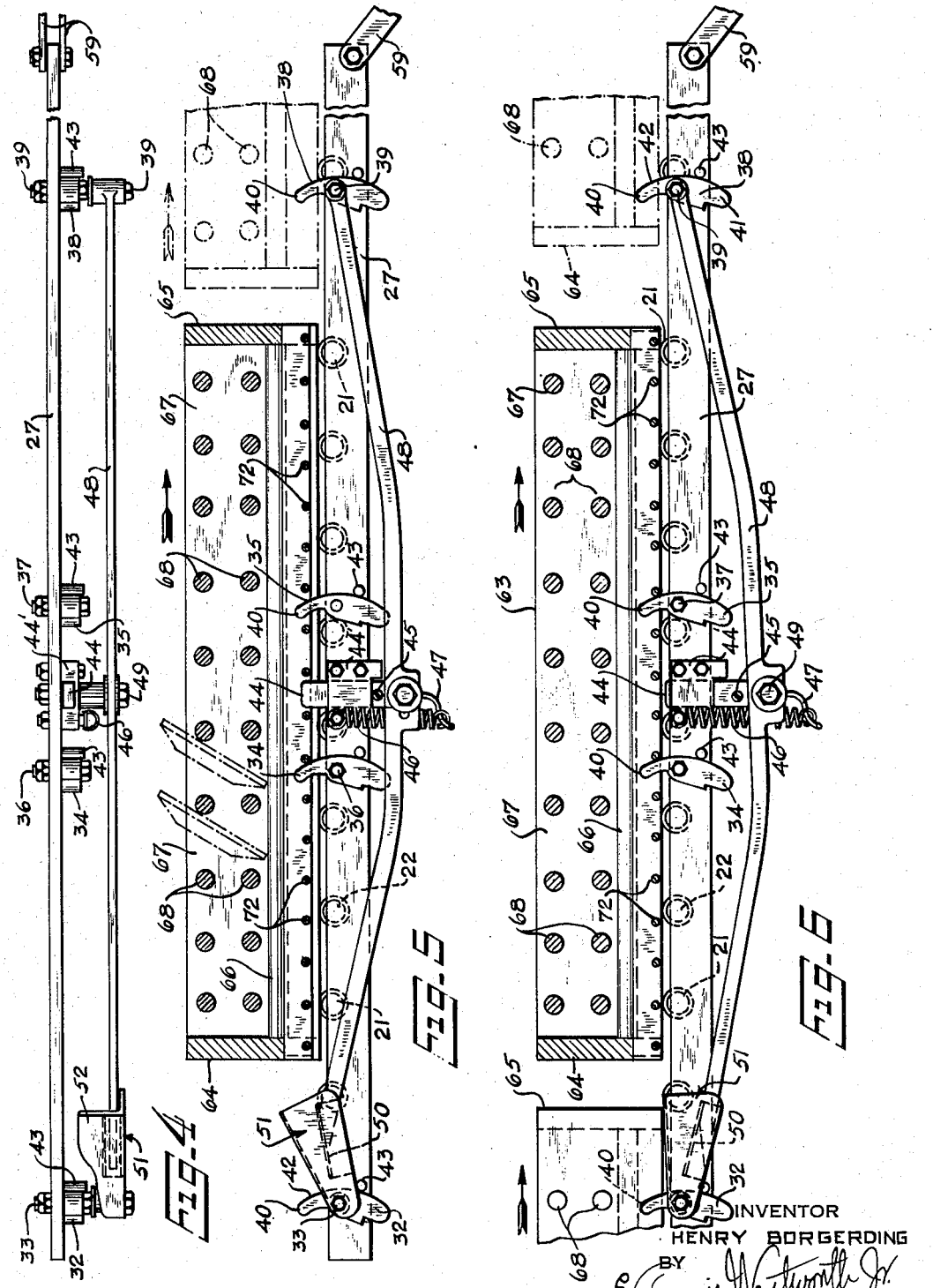

April 24, 1951 H. BORGERDING 2,550,523
DISHWASHING MACHINE FEEDER
Filed Aug. 21, 1947 3 Sheets-Sheet 3

INVENTOR
HENRY BORGERDING
BY
ATTORNEY

Patented Apr. 24, 1951

2,550,523

UNITED STATES PATENT OFFICE 2,550,523

DISHWASHING MACHINE FEEDER

Henry Borgerding, Lodi, N. J., assignor to Universal Washing Machinery Co., Nutley, N. J., a corporation of New Jersey Application August 21, 1947, Serial No. 769,863

11 Claims. (Cl. 198—221)

This invention relates to washers and more particularly to conveyors by means of which baskets containing dishes are conveyed into and out of dishwashing machines.

The present invention provides a conveyor for a dishwashing machine by means of which a rack of dishes is conveyed into a machine, is delayed within said machine while the dishes are being washed and is thereafter conveyed from the machine upon the placing of another rack of dishes to be washed on the conveyor.

The invention will be understood from the following description when considered in connection with the accompanying drawings forming a part thereof and in which:

Fig. 1 is a horizontal sectional view of a dishwashing machine embodying the present invention and taken on the line 1—1 of Fig. 2;

Fig. 2 is a side elevational view of a dishwashing machine embodying the present invention with a portion of the casing thereof broken away and showing a rack of dishes locked in position therein;

Fig. 3 is a partial vertical sectional view taken on the line 3—3 of Fig. 2;

Fig. 4 is a plan view of the dish rack conveyor of the present invention;

Fig. 5 is a side elevational view of the conveyor illustrated in Fig. 4 and showing a dish rack locked in position within a dishwashing machine;

Fig. 6 is a view similar to Fig. 5 but illustrates the dish rack within the machine released for movement therefrom;

Like characters of reference refer to like parts throughout the several views.

Figure 7:
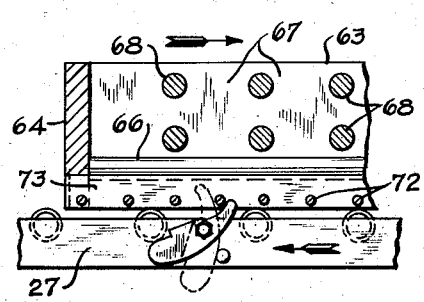
Fig. 7 is a partial side elevational view of the conveyor mechanism illustrating the movement of one of the pawls thereof when the dish rack is conveyed in one direction.

Referring to the drawings, particularly Figs. 1 to 3 thereof, the reference numeral 10 designates the casing of a dishwashing machine having opposite side walls 11 and 12, opposite end walls 13 and 14, a top 15 and a bottom 16. The opposite side walls, opposite end walls, top and bottom form a washing chamber 17. Legs 18, which support the casing 10, are secured to the four corners thereof.

A track on which dish baskets are conveyed through the washing chamber 17 is disposed intermediate the top 15 and bottom 16. As shown, the track comprises L-shaped track members 19 and 20 which extend parallel to one another and longitudinally of chamber 17 in the same horizontal plane and are secured at the opposite ends thereof to end walls 13 and 14 respectively thereby forming a guideway through chamber 17 for a dish rack. The track members are laterally spaced from one another in the washing chamber a sufficient distance to accommodate a dish rack of the desired width and are so mounted in the chamber that one leg of an L-shaped member extends vertically upwardly and the other leg extends horizontally toward the other L-shaped member. A plurality of rollers 21 are associated with each of the track members 19 and 20. The rollers 21 are revolubly mounted in horizontal alignment and in spaced relationship with one another on pins 22 which pins are secured in the vertically extending legs of members 19 and 20 and project inwardly toward the opposite member 19 or 20. The end walls 13 and 14 extend upwardly from the bottom 16 to a point in substantial horizontal alignment with the rollers 21 to thereby respectively provide an inlet opening 23 through which a basket of dishes may enter the washing chamber 17 and an outlet opening 24 through which baskets of dishes may be withdrawn from the chamber as will hereafter be fully described. The inlet and outlet openings are normally covered by flexible curtains, not shown, during the washing operation. The opposite ends of the vertically extending legs of track members 19 and 20 are flared outwardly as shown at 25 and 26, Fig. 1, so that the dish racks may be easily guided onto the track members.

The conveyor of the present invention comprises a bar 27 extending longitudinally of chamber 17 parallel to and between the track members 19 and 20 in a horizontal plane. The bar 27 is mounted for reciprocal horizontal movement in longitudinally spaced bearings 28 and 29 (Figs. 1 and 2). The bearings are supported in chamber 17 on channel bars 30 and 31 respectively which extend transversely of the chamber and are supported at the opposite ends thereof on side walls 11 and 12 respectively of the casing. As shown more particularly in Figs. 4 to 6, the bar 27 has a plurality of pawls pivotally mounted thereon. An end pawl 32 is pivotally mounted on a pivot bolt 33 secured to bar 27 adjacent the end thereof nearest inlet opening 23 of chamber 17, intermediate pawls 34 and 35 are pivotally mounted in respect to bar 27 intermediate the opposite ends of the bar on spaced pivot bolts 36 and 37 respectively, which bolts are secured to the bar, and an end pawl 38 is pivotally mounted on a pivot bolt 39 secured to bar 27 adjacent the end thereof nearest outlet opening 24 of chamber 17. Pawls 32, 34, 35 and 38 have an arcuate shaped actuating edge 42, a tongue 40 at one end thereof and a bottom 41 which is of greater width than tongue 40, said pawls being of such length that the tongue end 40 thereof projects upwardly beyond the horizontal plane of roller 21 when the pawls are in upright position. The pawls are so mounted on bar 27 that the arcuate edge 42 is toward outlet opening 24 of chamber 17 and are pivoted at such point intermediate the tongue end 40 thereof and the bottom end 41 that said bottom end will overbalance the tongue end and the pawls will normally be disposed in upright position by force of gravity. As shown in Figs. 1 to 7, an engaging pin 43 cooperates with each pawl which pins are secured in bar 27 to project laterally outwardly therefrom so as to engage the arcuate edge 42 thereof below the pivot point of said pawls.

Locking mechanism by means of which a rack of dishes is locked against movement in relationship to conveyor bar 27 is provided which mechanism comprises a latch member 44 (Figs. 4 to 6) mounted for vertical reciprocal movement in a bearing 44' which bearing is secured to bar 27 at a point intermediate pawls 34 and 35. The latch member is of such length as to project upwardly above the horizontal plane of rollers 21 when in its uppermost position and engage a dish rack thereon. The latch has a stop 45 thereon which engages bearing 44' to limit the upward movement of said latch. Latch member 44 is held in locked position in relationship to a dish rack by the tension of a coil spring 46 which is secured at one end to bar 27 and at the opposite end to an extension 47 on the lower end of said latch member. A latch release is provided to unlock latch member 44 from a dish rack and permit movement of the rack through the chamber. The latch release comprises a releasing lever 48 pivotally mounted at 49 intermediate its opposite ends to the lower portion of latch member 44. One end of releasing lever 48 is pivotally mounted on pivot bolt 39 of pawl 38 while the opposite end of lever 48 slidably engages a projection 50 on a releasing member 51. The releasing member 51 is pivotally mounted at one end thereof on pivot bolt 33 of pawl 32 and, when the latch 43 is in locked position in relationship to a dish rack, the upper flanged surface 52 of release member 51 projects upwardly at an angle away from pivot 33 to a point above the level of rollers 21 and is normally maintained in such position by the tension of spring 46 acting on releasing lever 48 through extension 47 and pivot 49.

Bar 27 is horizontally reciprocated by a reciprocating mechanism which, as shown more particularly in Figs. 1 and 2, comprises a motor M mounted on a platform beneath bottom 16 of chamber 17 and associated links and levers. The motor shaft has an eccentric lever 53 keyed thereto which eccentric is pivotally connected to a lever 54 which lever in turn is pivotally connected to a link 55. A transversely extending shaft 56 is rotatably mounted in bearing blocks 57 and has one end of link 55 securely mounted thereon. An actuating lever 58 is mounted at one end thereof on shaft 56 so as to turn therewith, the opposite end of said actuating lever being pivoted to one end of a clevis 59. The opposite end of the clevis is pivotably mounted on the end of the bar 27 adjacent the outlet opening 24 of the chamber 17.

As shown, a plurality of lower spray pipes 60 (Figs. 1 and 3), which extend longitudinally of chamber 17 in the central portion thereof below track members 19 and 20 and are laterally spaced from one another, are provided to direct streams of washing water upwardly over dishes in a dish rack on the track members while a plurality of similar spray pipes 61 are positioned above said track members to direct streams of washing water downwardly onto said dishes.

Figure 10:
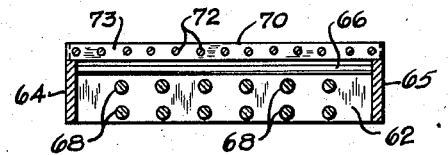
Fig. 10 is a sectional view taken on the line 10—10 of Fig. 9.
Figure 9:
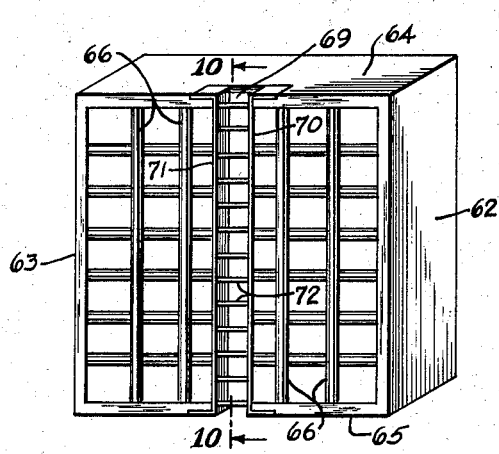
Fig. 9 is a perspective view showing particularly the bottom of a dish rack.

A dish rack suitable for use with the dishwashing machine of the present invention is shown in Figs. 9 and 10 and in various positions in relationship to bar 27 in Figs. 2, 5 and 6. The dish rack comprises opposite side walls 62 and 63, and opposite end walls 64 and 65. A plurality of laterally spaced rods 66 extend longitudinally of the rack adjacent the bottom thereof between end walls 64 and 65 in which walls the opposite ends of the rods are secured. Spaces 67 for receiving dishes are formed by an upper row and a lower row of longitudinally spaced rods 68 which extend transversely of the rack between side walls 62 and 63 in which side walls the opposite ends of the rods 68 are mounted. Rods 68 of the upper row and rods 68 of the lower row are in vertical alignment. A channel 69 which extends longitudinally of the rack at the bottom thereof is formed intermediate side members 62 and 63 by spaced walls 70 and 71 the opposite ends of which are bent at right angles to the walls and secured to the end walls 64 and 65 of the rack. Pins 72 project transversely of channel 69 and are mounted at the opposite ends thereof in walls 70 and 71. The pins 72 are spaced from one another longitudinally of the channel to form ratchet spaces 73 into which the tongue 40 of pawls 32, 34, 35 and 38 of conveyor bar 27 extend.

A table adapted to receive a dish rack is indicated in dot and dash lines at 74 Fig. 2 and is attached to end wall 13 of casing 10 adjacent inlet opening 23. A similar table, not shown, may be positioned at the opposite end of the casing to receive racks passing outwardly of chamber 17 through outlet opening 24.

In operation, the spray pipes 60 and 61 are placed in operation and the motor M is started so that conveyor bar 27 is reciprocated in a horizontal plane. As the shaft of motor M is rotated, eccentric lever 53 is rotated which reciprocates lever 54, as indicated by the arrows in Fig. 2, which in turn alternately moves the link 55 and shaft 56 in a clockwise and counterclockwise direction. Movement of shaft 56 causes bar 27 to be reciprocated through movement of actuating lever 58 and clevis 59.

When it is desired to feed a rack of dishes into chamber 17 for washing, the rack is positioned on table 74 and is slid forward (to the right as indicated by arrow in Fig. 2). As the rack is slid forward, end 65 engages the tongue 40 of pawl 32 causing the pawl to pivot in a clockwise direction on pivot bolt 33 thereby permitting end 65 to pass into engagement with the upper flanged surface of release member 5. The weight of the rack presses said member downwardly, or in a clockwise direction, on pivot bolt 33. Downward movement of release member 51 causes releasing lever 48 to move downwardly, or in a counterclockwise direction, on pivot bolt 39 which in turn moves latch member 44 downwardly and out of the path of a rack engaging the rollers 21 on track members 19 and 20. As the end wall 65 passes pawl 32 the pawl, by force of gravity, moves in a counterclockwise direction the tongue 40 of said pawl entering a ratchet space 73 between adjacent pins 72. At this period of the operation, the conveyor bar 27, the pawls, latch, and latch releasing mechanism are in the position shown in Fig. 6. When bar 27 is moved to the left, Figs. 1 to 7, the tongue 40 of pawl 32 engages a pin 72 to the left of a ratchet space 73 which causes the pawl to pivot in a clockwise direction on pivot 33 permitting the pawl to pass said pin as the bar 27 continues its movement to the left. The pawl 32, as it passes from engagement with said pin to the left of a space 73, turns by force of gravity in a counterclockwise direction to an upright position so that tongue 40 projects upwardly into the next ratchet space 73 to the left of the first-mentioned ratchet space. At this point of the operation, the bar 27 has reached the limit of its movement to the left and is now ready to be moved to the right, Figs. 1 to 7. As the bar 27 moves to the right, the arcuate edge 42 of tongue 40, on pawl 32 engages said pin to the left of space 73 above pivot 33 and said arcuate edge of the body of the pawl engages pin 43 at a point below pivot 33. Since pawl 32 is engaged on arcuate edge 42 at opposite sides of pivot 33, it is maintained in upright position and the dish rack is moved to the right on rollers 21 with bar 27 through engagement of the pawl with said pin 73 until the extent of movement of bar 27 to the right is reached. When the extent of movement of the bar to the right is reached, the reciprocating mechanism again moves said bar to the left, the tongue 40 of pawl 32 engaging the next pin 72 to the left of the space into which it has projected causing the pawl to turn in a clockwise direction, pass said pin and enter the next space 73 to the left. The rack is again moved to the right with bar 27 by pawl 32 as hereinbefore described when the movement of said bar is reversed by the reciprocating mechanism. The dish rack is thereby advanced as the bar 27 is reciprocated, during which advancement a pin 72 at the forward end (formed by end wall 65) engages tongue 40 of pawl 34 and then tongue 40 of pawl 35. The pawls 34 and 35 act upon the pins 72 of the dish rack in the same manner as pawl 32 to advance the rack to the right.

As the rack moves to the right, Figs. 1 to 7, it passes from engagement with release member 51. When the end 64 moves past the release member, the various parts assume the position shown in Fig. 5. The tension of spring 46 acting on releasing lever 48 turns the releasing lever in a clockwise direction on pivot 39 which causes the member 51 to pivot in a counterclockwise direction on pivot 33 so that said member will extend into the path of the next dish rack to be fed into washing chamber 17. Latch 44 moves upwardly, as spring 46 causes said clockwise turning of lever 48, and enters a ratchet space 73, said latch being of a width of substantially the same dimension as the distance between adjacent pins 72. Further reciprocation of bar 27, when the various parts are in the position shown in Fig. 5, causes the dish rack to reciprocate therewith through engagement of latch 44 with pins 72 on opposite sides of a space 73. The dishes in a rack are washed by spray from spray pipes 60 and 61 as the tray is reciprocated in washing chamber 17 by conveyor bar 27.

When the washing operation in chamber 17 is completed, another dish rack is placed on table 74 and slided to the right, Fig. 1, and into engagement with releasing member 51 which moves the releasing member, releasing lever 48 and latch 44 downwardly as hereinbefore described (Fig. 6). Upon movement of latch 44 downwardly and out of engagement with pins 72, the first-mentioned dish rack is free to be moved to the right, Figs. 1 to 7, by action of pawls 34 and 35 which are operated by bar 27 in the same manner as pawl 32, as hereinbefore described, to advance the first-mentioned rack toward outlet opening 24 of casing 10. As the first-mentioned rack is advanced toward outlet 24, pawl 38 engages pins 72 to act thereupon in the same manner as pawls 32, 34 and 35 and thereby move the rack from the washing chamber through outlet 24 and onto a table, not shown, associated therewith. Also, pawl 32 acts upon pins 72 of the second-mentioned dish rack (Fig. 6) to move said rack to the right, Figs. 1 to 6. The cycle of operation in respect to the second-mentioned and succeeding dish racks is the same as hereinbefore described in respect to the first-mentioned rack.

In some installations of dishwashing machines, it is desirable to pass the dish racks from right to left instead of from left to right as shown in Figs. 1 to 7.

Figure 8:
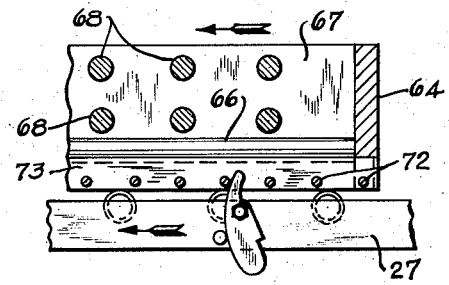
Fig. 8 is a view similar to Fig. 7 but showing the mounting of a pawl in a dishwashing machine wherein the dish rack is to be moved in a direction opposite to that shown in Fig. 7.

The embodiment of the invention shown in Fig. 8 illustrates a bar 27 which is adapted to advance a dish rack in a direction opposite to that shown in Figs. 1 to 7. The pawls are reversed on bar 27 so that arcuate edge is on the left instead of on the right and the pins 43 also are on the left instead of on the right as in Figs. 1 to 7. The operation, except as to the direction of advancement of the rack, is the same as the operation of Figs. 1 to 7.

Insomuch as various modifications may be made in the form of the apparatus herein disclosed and in the location and relative arrangement of the several parts of the invention without departing from the principles thereof, it will be understood that the invention is not to be limited, excepting by the scope of the appended claims.

What is claimed is:

1. In a dishwashing machine comprising a casing having a washing chamber wherein dishes within a dish container are washed, said chamber having an inlet through which a container passes into and an outlet through which a container passes out of the chamber, and apparatus for conveying dish containers through the washing chamber, said apparatus comprising reciprocating means adapted to normally operatively act upon a container at intervals and intermittently advance said container from the chamber inlet toward the chamber outlet, means for imparting reciprocating movement to said reciprocating means, locking means in the chamber adapted in its operative position to engage and lock said container in relationship to the reciprocating means for reciprocal movement therewith thereby preventing intermittent movement thereof by the reciprocating means and in its inoperative position to disengage said container and permit said intermittent movement, and actuating means associated with the locking means and disposed in the path of a container so as to be engaged by said container entering the chamber and be disengaged thereby when the container is advanced to a predetermined position in the chamber by said reciprocating means, the actuating means cooperating with the locking means so as to actuate said locking means to its inoperative position when the actuating means is in engagement with said container.

2. In a dishwashing machine comprising a casing having a washing chamber wherein dishes within a dish container are washed, said chamber having an inlet through which a container passes into and an outlet through which a container passes out of the chamber, means for guiding a container through the chamber, and apparatus for moving dish containers through the washing chamber, said apparatus comprising a reciprocating bar having at least one pawl thereon adapted to operatively act upon a container when the bar moves in one direction only and thereby intermittently advance said container from the chamber inlet toward the chamber outlet, means for imparting a reciprocating movement to said bar, locking means in the chamber adapted in its operative position to engage and lock said container in relationship to the reciprocating bar for reciprocal movement therewith thereby preventing intermittent movement thereof by the reciprocating bar and in its inoprative position to disengage said container and permit said intermittent movement, and actuating means associated with the locking means and disposed in the path of a container entering the chamber and be disengaged thereby when the container is advanced to a predetermined position in the chamber by said reciprocating bar, said actuating means cooperating with the locking means so as to actuate said locking means to its inoperative position when the actuating means is in engagement with said container.

3. In a dishwashing machine comprising a casing having a washing chamber wherein dishes within a dish container are washed, said chamber having an inlet through which a container passes into and an outlet through which a container passes out of the chamber, means for guiding a container through the chamber, and apparatus for moving dish containers through the washing chamber, said apparatus comprising a reciprocating bar having at least one pawl thereon adapted to operatively act upon a container when the bar moves in one direction only and thereby intermittently advance said container from the chamber inlet toward the chamber outlet, means for imparting a reciprocating movement to said bar, locking means in the chamber mounted on and movable with said bar, said locking means being adapted in its operative position to engage and lock said container in relationship to the reciprocating bar for reciprocal movement therewith thereby preventing intermittent movement thereof by the reciprocating bar and in its inoperative position to disengage said container and permit said intermittent movement, and actuating means associated with the locking means and disposed in the path of a container so as to be engaged by said container entering the chamber and be disengaged thereby when the container is advanced to a predetermined position in the chamber by said reciprocating bar, said actuating means cooperating with the locking means so as to actuate said locking means to its inoperative position when the actuating means is in engagement with said container.

4. In a dishwashing machine comprising a casing having a washing chamber wherein dishes within a dish container are washed, said chamber having an inlet through which a container passes into and an outlet through which a container passes out of the chamber, and apparatus for conveying dish containers through the washing chamber, said apparatus comprising reciprocating means adapted to normally operatively act upon a container at intervals and intermittently advance said container from the chamber inlet toward the chamber outlet, means for imparting reciprocating movement to said reciprocating means, locking means in the chamber mounted on and movable with said reciprocating means, said locking means being adapted in its operative position to engage and lock said container in relationship to the reciprocating means for reciprocal movement therewith thereby preventing intermittent movement thereof by the reciprocating means and in its inoperative position to disengage said container and permit said intermittent movement, and actuating means associated with the locking means and disposed in the path of a container so as to be engaged by said container entering the chamber and be disengaged thereby when the container is advanced to a predetermined position in the chamber by said reciprocating means, the actuating means cooperating with the locking means so as to actuate said locking means to its inoperative position when the actuating means is in engagement with said container.

5. In a dishwashing machine comprising a casing having a washing chamber wherein dishes within a dish container are washed, said chamber having an inlet through which a container passes into and an outlet through which a container passes out of the chamber, a horizontally extending guideway between said inlet and outlet openings in which a container is guided through the chamber, and apparatus for moving dish containers through the washing chamber, said apparatus comprising a substantially horizontally extending bar intermediate the opposite sides of and adjacent said guideway, a plurality of pawls mounted on said bar and longitudinally spaced from one another, said pawls being adapted to operatively act upon a container when the bar moves in one direction only and thereby intermittently advance said container from the chamber inlet toward the chamber outlet, means for imparting horizontal reciprocating movement to said bar, locking means comprising a latch mounted on and movable with said reciprocating bar, the latch in its operative position being adapted to engage and lock said container in relationship to the reciprocating bar for reciprocal movement therewith thereby preventing intermittent movement thereof by the reciprocating bar and in its inoperative position to disengage said container and permit said intermittent movement, and actuating means associated with said latch, the actuating means being mounted on and movable with the reciprocating bar and in the path of a container so as to be engaged by said container entering the chamber and be disengaged thereby when the container is advanced to a predetermined position in the chamber by said reciprocating bar, said actuating means cooperating with the latch so as to actuate said latch to its inoperative position when the actuating means is in engagement with said container.

6. A conveyor for conveying a container through a chamber, said conveyor comprising reciprocating means adapted to normally operatively act upon the container at intervals and intermittently move said container in one direction only through the chamber, means for imparting reciprocal movement to said reciprocating means, locking means in the chamber adapted in its operative position to engage and lock said container in relationship to the reciprocating means for reciprocal movement therewith thereby preventing intermittent movement thereof by the reciprocating means and in its inoperative position to disengage said container and permit said intermittent movement, and actuating means associated with the locking means and disposed in the path of a container so as to be engaged by said container entering the chamber and be disengaged thereby when the container is advanced to a predetermined position in the chamber by said reciprocating means, the actuating means cooperating with the locking means so as to actuate said locking means to its inoperative position when the actuating means is in engagement with said container.

7. A conveyor for conveying a container through a chamber, said conveyor comprising a reciprocating bar having at least one pawl thereon adapted to operatively act upon a container when the bar moves in one direction only and thereby intermittently move the container in said one direction, means for imparting a reciprocating movement to said bar, locking means in the chamber adapted in its operative position to engage and lock said container in relationship to the reciprocating bar for reciprocal movement therewith thereby preventing intermittent movement thereof by the reciprocating bar and in its inoperative position to disengage said container and permit said intermittent movement, and actuating means associated with the locking means and disposed in the path of a container so as to be engaged by said container entering the chamber and be disengaged thereby when the container is advanced to a predetermined position in the chamber by said reciprocating bar, said actuating means cooperating with the locking means so as to actuate said locking means to its inoperative position when the actuating means is in engagement with said container.

8. A conveyor for conveying a container through a chamber, said conveyor comprising a substantially horizontally extending bar, a plurality of pawls mounted on said bar and longitudinally spaced from one another, said pawls being adapted to operatively act upon a container when the bar moves in one direction only and thereby intermittently move the container in said one direction, means for imparting horizontal reciprocating movement to said bar, locking means comprising a latch mounted on and movable with said reciprocating bar, the latch in its operative position being adapted to engage and lock said container in relationship to the reciprocating bar for reciprocal movement therewith thereby preventing intermittent movement thereof by the reciprocating bar and in its inoperative position to disengage said container and permit said intermittent movement, and actuating means associated with said latch, the actuating means being mounted on and movable with the reciprocating bar and in the path of a container so as to be engaged by said container entering the chamber and be disengaged thereby when the container is advanced to a predetermined position in the chamber by said reciprocating bar, said actuating means cooperating with the latch so as to actuate said latch to its inoperative position when the actuating means is in engagement with said container.

9. A conveyor for conveying a dish container through a dishwashing chamber comprising a horizontally extending guideway for the container which guideway extends through the chamber, a substantially horizontally extending actuating bar adjacent said guideway and intermediate the opposite sides thereof, a plurality of pawls mounted on said bar and longitudinally spaced from one another, said pawls being adapted to operatively act upon a container when the bar moves in one direction only and thereby intermittently advance said container from one end of said guideway toward the other end thereof, means for imparting horizontal reciprocating movement to said bar, locking means comprising a latch mounted on and movable with said reciprocating bar, the latch in its operative position being adapted to engage and lock said container in relationship to the reciprocating bar for reciprocal movement therewith thereby preventing intermittent movement thereof by the reciprocating bar and in its inoperative position to disengage said container and permit said intermittent movement, and actuating means associated with said latch, the actuating means being mounted on and movable with the reciprocating bar and in the path of a container so as to be engaged by said container entering the chamber and be disengaged thereby when the container is advanced to a predetermined position in the chamber by said reciprocating bar, said actuating means cooperating with the latch so as to actuate said latch to its inoperative position when the actuating means is in engagement with said container.

10. A conveyor for conveying a dish container through a dishwashing chamber comprising a guideway having spaced parallel track members extending through the chamber in a substantially horizontally extending plane and on which a dish container is guided through the chamber, a substantially horizontally extending actuating bar disposed substantially centrally of the track members and mounted for reciprocating movement, a plurality of pawls mounted on said bar and longitudinally spaced from one another, said pawls being adapted to operatively act upon a container when the bar moves in one direction only and thereby intermittently advance said container from one end of the track toward the other end thereof, means for imparting horizontal reciprocating movement to said bar, locking means comprising a latch mounted on and movable with said reciprocating bar, the latch in its operative position being adapted to engage and lock said container in relationship to the reciprocating bar for reciprocal movement therewith thereby preventing intermittent movement thereof by the reciprocating bar and in its inoperative position to disengage said container and permit said intermittent movement, and actuating means associated with said latch, the actuating means being mounted on and movable with the reciprocating bar and in the path of a container so as to be engaged by said container entering the chamber and be disengaged thereby when the container is advanced to a predetermined position in the chamber by said reciprocating bar, said actuating means cooperating with the latch so as to actuate said latch to its inoperative position when the actuating means is in engagement with said container.

11. A conveyor for conveying a dish conainer through a dishwashing chamber comprising means for supporting and guiding a container, a reciprocating actuation bar associated with said first-mentioned means and adapted to operatively act upon a container, a plurality of pawls mounted on said bar and longitudinally spaced from one another, one of said pawls being positioned adjacent one end of the bar to engage a container entering the supporting and guiding means and another pawl being positioned adjacent the opposite end of the bar to engage a container leaving said supporting and guiding means, the plurality of pawls being adapted to operatively act on a dish container when the bar moves in one direction only and thereby intermittently advance said container from one end of said supporting and guiding means toward the other end thereof, means for imparting horizontal reciprocating movement to said bar, locking means comprising a latch mounted on and movable with said reciprocating bar, the latch in its operative position being adapted to engage and lock said container in relationship to the reciprocating bar for reciprocal movement therewith thereby preventing intermittent movement thereof by the reciprocating bar and in its inoperative position to disengage said container and permit said intermittent movement, and actuating means associated with said latch, the actuating means being mounted on and movable with the reciprocating bar and in the path of a container so as to be engaged by said container entering the chamber and be disengaged thereby when the container is advanced to a predetermined position in the chamber by said reciprocating bar, said actuating means cooperating with the latch so as to actuate said latch to its inoperative position when the actuating means is in engagement with said container.

HENRY BORGERDING.

REFERENCES CITED

The following references are of record in the file of this patent:

UNITED STATES PATENTS

| Number | Name | Date |
|---|---|---|
| 1,336,570 | Lathrop et al. | Apr. 13, 1920 |
| 1,400,894 | Mason | Dec. 20, 1921 |
| 1,993,154 | Elkington | Mar. 5, 1935 |
| 2,073,521 | Johnston et al. | Mar. 9, 1937 |